United States Patent [19]

Koda et al.

[11] Patent Number: 4,667,474
[45] Date of Patent: May 26, 1987

[54] STIRLING ENGINE

[75] Inventors: Toshihide Koda; Tetsuya Honda; Kiyoshi Taketoh; Tadahiro Yoshida, all of Amagasaki, Japan

[73] Assignee: Mitsubishi Denki Kabushiki Kaisha, Tokyo, Japan

[21] Appl. No.: 890,560

[22] Filed: Jul. 30, 1986

[30] Foreign Application Priority Data

Aug. 5, 1985 [JP] Japan ................................ 60-172630

[51] Int. Cl.⁴ .............................................. F02G 1/04
[52] U.S. Cl. ..................................................... 60/517
[58] Field of Search ......................................... 60/517

[56] References Cited

U.S. PATENT DOCUMENTS 3,848,877 11/1974 Bengtsson et al. ............... 60/517 X
4,483,141 11/1984 Kobayashi et al. .................. 60/517

Primary Examiner—Allen M. Ostrager
Attorney, Agent, or Firm—Leydig, Voit & Mayer

[57] ABSTRACT

An improved Stirling engine has a piston and a crosshead slidably disposed inside a cylinder and secured to one another by a piston rod so as to reciprocate as a single body with a space formed between the crosshead and the piston. An oil-deflecting guard for deflecting oil which is scattered by the movement of the crosshead is disposed between the crosshead and the piston and is supported so as to move with the crosshead. A first oil-absorbing member for absorbing oil which enters the space above the oil-deflecting guard is disposed on the oil-deflecting guard on the piston side thereof. A second oil-absorbing member is disposed between the first oil-absorbing member and the piston with a space therebetween. The space between the crosshead and the piston can be connected with the inside of a crankcase by oil drainage holes.

4 Claims, 6 Drawing Figures

STIRLING ENGINE

BACKGROUND OF THE INVENTION

This invention relates to a Stirling engine, and in particular it relates to a Stirling engine in which lubricating oil can be prevented from reaching the piston and entering the heat exchanger of the engine.

FIG. 1 is a cross-sectional view of a conventional, single-cylinder Stirling engine such as that described by G. Walker in the book "Stirling Engine" (Oxford University Press, 1980). In the figure, element number 1 is a crankcase which serves as a base for the engine. Element number 2 is a flange which is secured to the crankcase 1 by bolts or other suitable fasteners which pass through holes formed in the crankcase 1, and element number 3 is a bearing housing which is secured to the crankcase 1 in the same manner as the flange 2. Element number 4 is a flange which is secured to the crankcase 1, element number 5 is a bearing which is secured to the bearing housing 3, element number 6 is a bearing which is secured to the flange 2, and element number 7 is a crankshaft which is rotatably supported by bearing 5 and bearing 6 and which transmits the power generated by the Stirling engine to an unillustrated load. Element number 8 is a mechanical seal which surrounds the crankshaft 7 and prevents gas from leaking from the inside of the crankcase 1. Element number 9 and element number 10 are balance weights which are secured to the crankshaft 7 and which balance it during rotation. Elements number 11 and 12 are piston connecting rods which are rotatably connected to the crankshaft 7 by unillustrated bearings. The upper ends of the piston connecting rods 11 and 12 are connected to a cylindrical crosshead 13, and the crosshead 13 is in turn rigidly connected to a piston 15 by a hollow piston rod 14. The crosshead 13 and the piston 15 are slidably disposed inside a cylinder 16 which is rigidly secured to the upper portion of the crankcase 1. Element number 24 is an annular airproof wall which is secured to the inner surface of the cylinder 16. Its inner surface surrounds the outer surface of the piston rod 14, and an unillustrated seal is provided between the airproof wall 24 and the piston rod 14. The airproof wall 24 prevents the spread of lubricating oil from the crosshead side to the piston side as well as the inflow of gas. Element number 25 is a compression buffer space with a relatively large volume which absorbs variations in pressure which develop in the space between the piston 15 and the airproof wall 24 during operation of the engine. Element number 19 is a first displacer connecting rod which is rotatably connected to the crankshaft 7 by an unillustrated bearing. Element number 20 is a pin and element number 21 is a second displacer connecting rod which is connected to the first displacer connecting rod 19 by the pin 20. The second displacer connecting rod 21 passes through the center of the crosshead 13, the piston rod 14, and the piston 15, and is secured to a displacer 22 which is slidably disposed inside the upper portion of the cylinder 16. The bottom of the crankcase 1 is filled with lubricating oil 23 for lubricating the moving portions of the engine.

During the operation of a conventional Stirling engine of this type, the outer surface of the crosshead 13 and the inner surface of the cylinder 16 are lubricated by the oil 23. The reciprocating motion of the crosshead 13 forms the oil 23 into a mist which is scattered into the space between the crosshead 13 and the piston 15. This mist of lubricating oil 23 adheres to the piston rod 14 and passes through minute gaps between the airproof wall 24 and the piston rod 14 to reach the piston side of the airproof wall 24. This oil 23 may then penetrate into the portion of the cylinder 16 above the piston 15 and enter the unillustrated heat exchanger through the holes 16a in the cylinder, resulting in large decreases in operating efficiency and reliability.

SUMMARY OF THE INVENTION

It is an object of the present invention to overcome the above-described problems and provide a Stirling engine in which lubricating oil can be prevented from reaching the piston and entering the heat exchanger of the engine.

In a Stirling engine according to the present invention, an oil-deflecting guard is provided between a crosshead and a piston which are secured to one another by a piston rod. The oil-deflecting guard is supported so as to move together with the crosshead. A first oil-absorbing member is mounted on this guard on the piston side of the guard. The oil-deflecting guard deflects oil which is scattered by the movement of the crosshead, and the first oil-absorbing member absorbs oil which could not be stopped by the guard and prevents oil from reaching the piston. A second oil-absorbing member may also be provided between the first oil-absorbing member and the piston so as to absorb any oil which could not be stopped by the oil-deflecting guard and the first oil-absorbing member.

BRIEF DESCRIPTION OF THE DRAWINGS

In the drawings, the same reference numerals indicate the same or corresponding parts.

DESCRIPTION OF THE PREFERRED EMBODIMENTS

Figure 1:
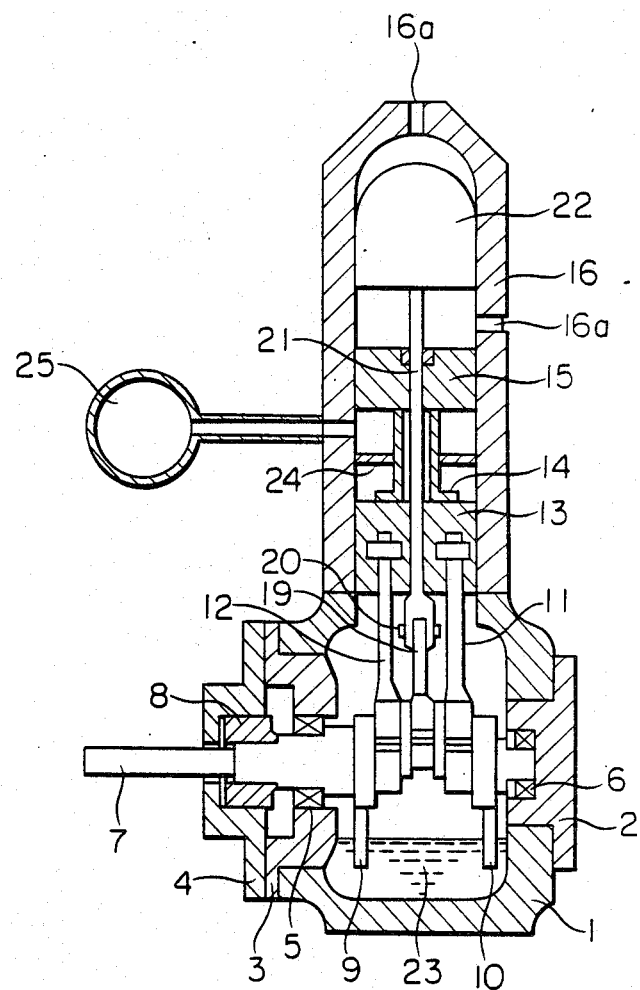
FIG. 1 is a vertical cross-sectional view of a conventional Stirling engine.
Figure 2:
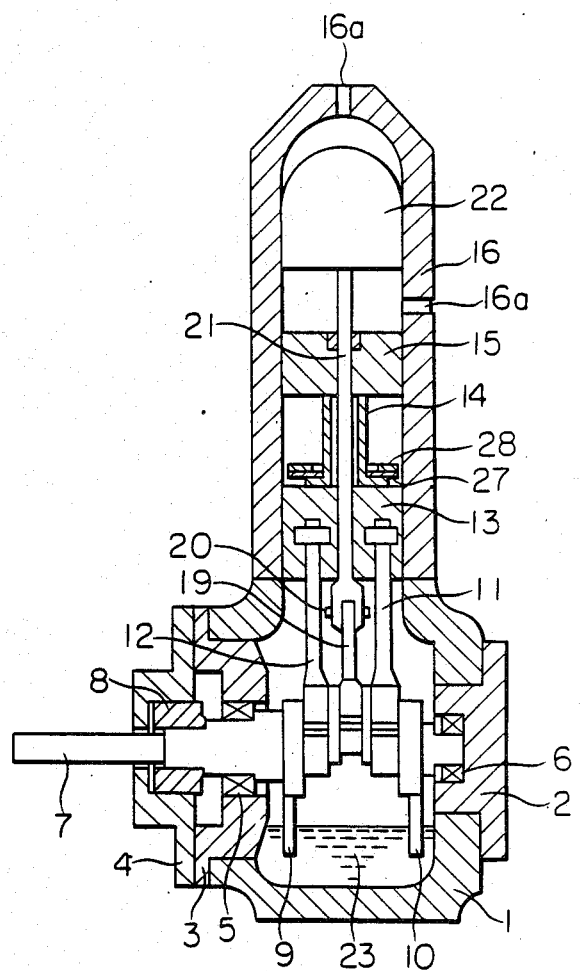
FIG. 2 is a vertical cross-sectional view of a Stirling engine according to a first embodiment of the present invention.
Figure 3:
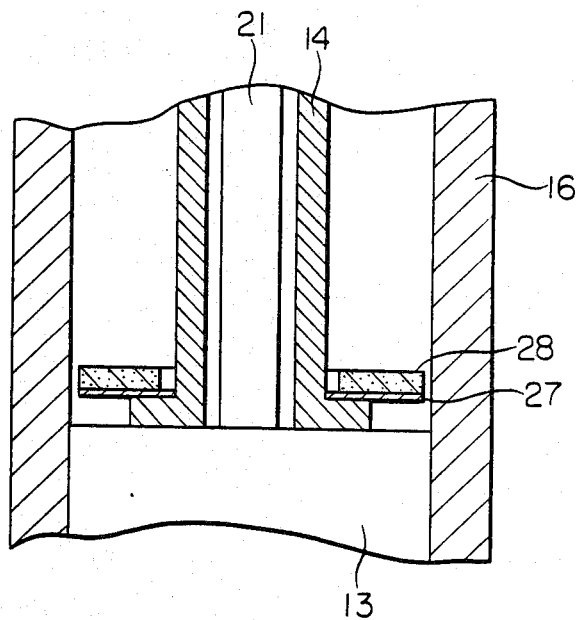
FIG. 3 is an enlarged cross-sectional view of the vicinity of the oil-deflecting guard of the embodiment of FIG. 2.

Hereinbelow, a number of preferred embodiments of the present invention will be described while referring to the accompanying drawings. FIGS. 2 and 3 illustrate a first embodiment of the present invention. This embodiment has basically the same structure as the conventional Stirling engine shown in FIG. 1, with a crosshead 13 and a piston 15 slidably disposed inside a cylinder 16, the crosshead 13 being separated from the piston 15 by a space and rigidly connected thereto by a piston rod 14. However, unlike the conventional engine, it has an oil-deflecting guard 27 and a first oil-absorbing member 28 disposed between the crosshead 13 and the piston 15. As shown in FIG. 3, the oil-deflecting guard 27 comprises an annular disk which is secured to the piston rod 14 and separated from the crosshead 13. The first oil-absorbing member 28 is partly or entirely made of a porous material which is permeable to air and which can absorb lubricating oil. Some materials which are suitable for use as the first oil-absorbing member 28 are a resin sponge, foamed metal, and metallic mesh or a layer thereof. The first oil-absorbing member 28 is secured to the top surface of the oil-deflecting guard 27.

The operation of this embodiment is identical to that of a conventional Stirling engine. During operation, when the reciprocating motion of the crosshead 13 produces a fine mist of the lubricating oil 23 which lubricates the wall of the cylinder 16, the lubricating oil 23 is deflected by the lower surface of the oil-deflecting guard 27 and is largely prevented from entering the space between the oil-deflecting guard 27 and the piston 15. The small amount of oil 23 which manages to pass through the gaps between the outer surface of the oil-deflecting guard 27 and the inner surface of the cylinder 16 is absorbed by the first oil-absorbing member 28 and is prevented from reaching the piston 15. Furthermore, the first oil-absorbing member 28 prevents oil 23 which adheres to the oil-preventing guard 27 from again being turned into a mist and scattered by the reciprocating motion of the oil-deflecting guard 27 together with the crosshead 13.

Therefore, lubricating oil 23 is prevented from penetrating into the space above the piston 15 and entering the unillustrated heat exchanger, and the operating efficiency and reliability of the engine can be maintained at a high level.

Figure 4:
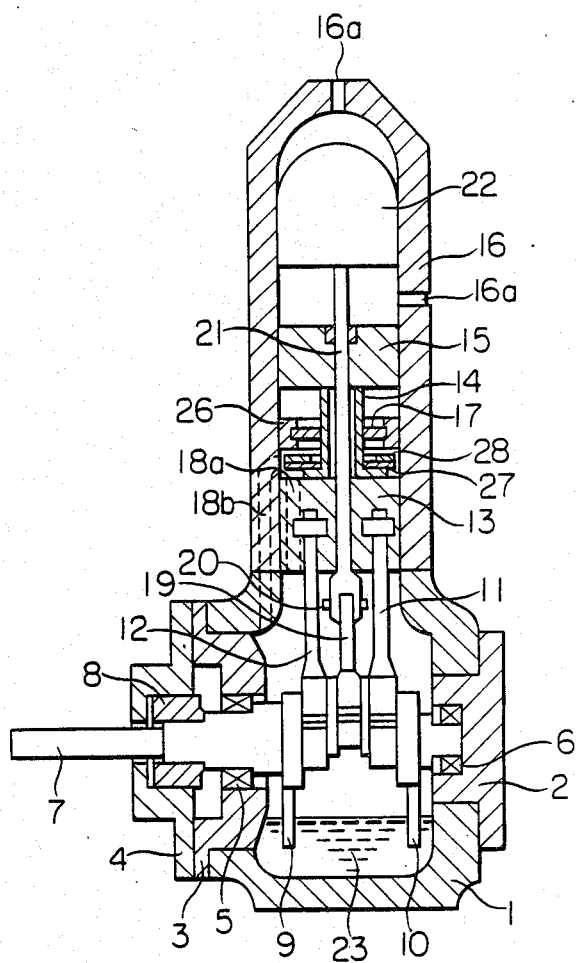
FIG. 4 is a vertical cross-sectional view of a Stirling engine according to a second embodiment of the present invention.
Figure 5:
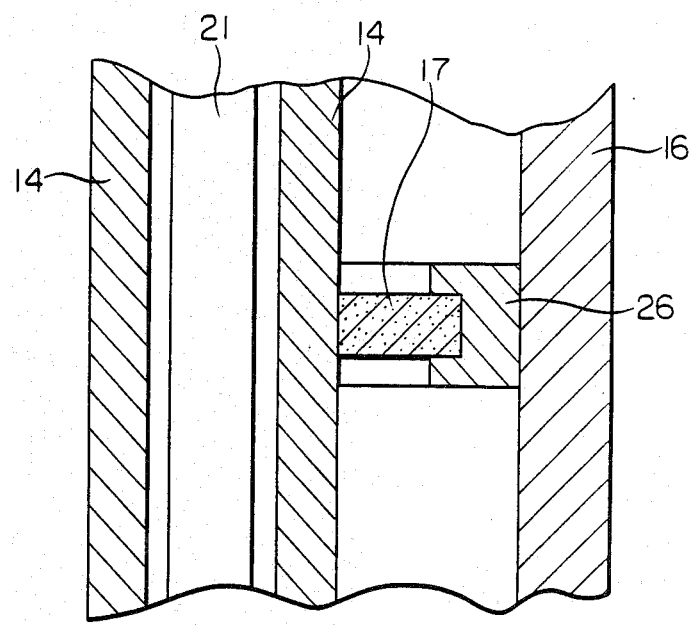
FIG. 5 is an enlarged cross-sectional view of the vicinity of the second oil-absorbing member of the embodiment of FIG. 4.

FIGS. 4 and 5 illustrate a second embodiment of a Stirling engine according to the present invention. This embodiment differs from the first embodiment in that it further comprises a second oil-absorbing member 17 which is disposed between the first oil-absorbing member 28 and the piston 15. The second oil-absorbing member 17 is made of a porous material which is permeable to air and which can absorb lubricating oil, and it may be made of the same material as the first oil-absorbing member 28. It is supported by an annular supporting member 26 which is secured to the inner wall of the cylinder 16. Oil drainage holes 18a and 18b are formed in the wall of the cylinder 16 and the crosshead 13, respectively, so as to connect the space between the crosshead 13 and the piston 15 with the inside of the crankcase 1. These oil-drainage holes 18a and 18b allow lubricating oil 23 and air to flow from the space above the crosshead 13 into the crankcase 1. Although two oil-drainage holes are illustrated, it is possible to provide only one and achieve the same effects.

During the operation of this embodiment, lubricating oil 23 which is scattered by the movement of the crosshead 13 is largely deflected by the oil-deflecting guard 27 or absorbed by the first oil-absorbing member 28. Oil 23 which can not be absorbed by the first oil-absorbing member 28 is absorbed by the second oil-absorbing member 17, and therefore the ability to prevent oil 23 from reaching the piston 15 is improved. When a certain amount of oil 23 has been absorbed by the oil-absorbing members 28 and 17, it flows down through the oil drainage holes 18a and 18b and is returned to the crankcase 1. Because air can also pass through the oil drainage holes 18a and 18b, the inside of the crankcase 1 can serve as a buffer space and it is not necessary to provide a separate buffer space 25 as in the conventional Stirling engine of FIG. 1.

Figure 6:
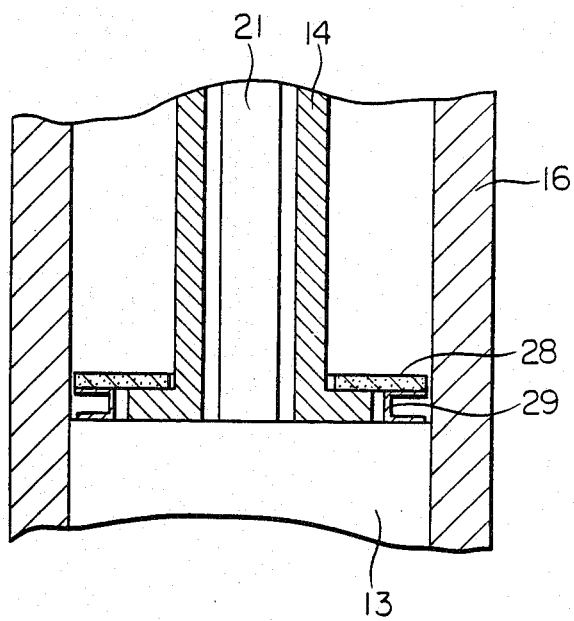
FIG. 6 is an enlarged cross-sectional view of the vicinity of the oil-deflecting guard of a Stirling engine according to a third embodiment of the present invention.

In the previous two ebodiments, the oil-deflecting guard 27 was an annular disk secured to the piston rod 14, but as long as it is able to deflect oil 23 scattered by the crosshead 13 and to serve as a support for a first oil-absorbing member, it is possible for it to have other shapes. FIG. 6 illustrates a portion of a third embodiment of the present invention in which an oil-deflecting guard 29 is a flanged annular member with a C-shaped cross section. The bottom flange of the guard 29 is secured to the top surface of the crosshead 13 and serves as a base, while the top flange supports a first oil-absorbing member 28 and serves to deflect lubricating oil 23. A first oil-absorbing member 28 spans the gap between the inner surface of the oil-deflecting guard 29 and the piston rod 14. This embodiment is otherwise identical to either of the previous embodiments and it provides the same effects.

What is claimed is:

1. An improved Stirling engine of the type having a piston slidingly disposed in a cylinder which is mounted on a crankcase, a crosshead which is slidingly disposed inside said cylinder and which is connected to said piston by a piston rod so as to move together with said piston and which is separated from said piston by a space, wherein the improvement comprises:
   an oil-deflecting guard which is disposed in the space between said crosshead and said piston and which is supported so as to move together with said crosshead; and
   a first oil-absorbing member which is disposed on said oil-deflecting guard on the piston side of said oil-deflecting guard.

2. An improved Stirling engine as claimed in claim 1, further comprising a second oil-absorbing member which is disposed in the space between said crosshead and said piston on the piston side of said first oil-aborbing member and which is separated by a space from said first oil-absorbing member.

3. An improved Stirling engine as claimed in claim 2, wherein an oil drainage hole which extends between the inside of said crankcase and said space between said crosshead and said piston is formed in at least one of said crosshead and the wall of said cylinder.

4. An improved Stirling engine as claimed in claim 2, wherein said second oil-absorbing member is supported by the inner wall of said cylinder.

* * * * *